United States Patent [19]

Giuffrida et al.

[11] Patent Number: 5,211,823
[45] Date of Patent: May 18, 1993

[54] PROCESS FOR PURIFYING RESINS UTILIZING BIPOLAR INTERFACE

[75] Inventors: Anthony J. Giuffrida, North Andover; Gary C. Ganzi, Lexington, both of Mass.

[73] Assignee: Millipore Corporation, Bedford, Mass.

[21] Appl. No.: 717,460

[22] Filed: Jun. 19, 1991

[51] Int. Cl.$^5$ .................. B01D 61/46; B01D 61/58
[52] U.S. Cl. ..................... 204/182.4; 204/182.5; 204/131
[58] Field of Search ............... 204/182.4, 182.5, 131

[56] References Cited

U.S. PATENT DOCUMENTS

| | | | |
|---|---|---|---|
| 3,074,864 | 1/1963 | Gaysowski | 204/182.4 |
| 4,871,431 | 10/1989 | Parsi | 204/182.4 |
| 4,969,983 | 11/1990 | Parsi | 204/182.4 |

Primary Examiner—John Niebling
Assistant Examiner—Arun S. Phasge
Attorney, Agent, or Firm—Andrew T. Karnakis; Paul J. Cook

[57] ABSTRACT

Purified ion exchange resin particles are provided in a bifunctional electrodeionization step having anion depletion compartments containing anion exchange resin particles which are purified and cation depletion compartments containing cation exchange resin particle which are purified as well as ion concentration compartments. The bifunctional electrodeionization step for purifying resin particles is conducted under conditions to disassociate water into hydrogen ions and hydroxyl ions. Purified water having a purity of at least 1 megohm-cm is introduced into the anion depletion compartment and cation depletion compartments and water for accepting ionic impurities is introduced into the ion concentration compartments. The purified water is produced in an initial purification step which also can be an electrodeionization step. The water effluent from the anion depletion compartments and cation depletion compartments is recycled either to an initial water purification step or to the inlets of the anion depletion compartments or cation depletion compartments. The anion depletion compartments include an anion permeable membrane and a bifunctional interface. The cation depletion compartments include a cation permeable membrane and the bifunctional interface.

11 Claims, 3 Drawing Sheets

PROCESS FOR PURIFYING RESINS UTILIZING BIPOLAR INTERFACE

BACKGROUND OF THE INVENTION

This invention relates to a method for purifying ion exchange resins.

Presently, electrodeionization is a process utilized to purify water to remove ions and ionizable compositions therefrom. In electrodeionization apparatus, the liquid to be purified is introduced into one or more ion depletion compartments containing anion exchange resin particles and cation exchange resin particles. The width of the ion depletion compartments is defined by an anion permeable membrane and a cation permeable membrane which extend the length of the compartment and which, together with suitable spacers, serve to retain the resin particles in place. A second volume of liquid for accepting ions and ionizable compositions is passed through ion concentration compartments positioned adjacent the ion depletion compartments and separated therefrom by the ion permeable membranes. The ion concentration compartments may or may not contain ion exchange resin particles. The electrodeionization apparatus comprises a series of alternating ion depletion compartments and ion concentration compartments positioned between an anode and a cathode and means for applying an electrical potential between the anode and the cathode. In use, the volume of the liquid being treated is depleted of ions, while the volume of the second liquid passed through the concentration compartments becomes enriched with the ions transferred through the ion permeable membranes and carries them in concentrated form to be discarded. The ion exchange resin particles serve as a path for ion transfer serving as an increased conductivity bridge between the membranes to promote ion movement. Under conditions of reduced liquid salinity, high voltage and low flow, the resins also convert to the $H^+$ and $OH^-$ forms due to the splitting of water into its ions in a thin layer at the surfaces of the resin particles and membranes. This further improves the attainable quality of water. Electrodeionization processes are contrasted with electrodialysis processes which do not utilize resin particles within the ion depletion or concentration compartments.

Ion exchange resins also are utilized to purify water in a process which does not utilize electrical current. Water containing ions is contacted with resin particles in the hydrogen or hydroxyl form. The ions in solution then are exchanged with the hydrogen ions or hydroxyl ions by virtue of being contacted with the particles. After a finite time period of contact with impure water, the capacity of the resin for ion exchange is substantially reduced and the water product is insufficiently purified. At this point in the process, the ion exchange resin particles are replaced with ion exchange resin particles in the hydrogen or hydroxyl form. The depleted resin then is regenerated either by being contacted with an acid to produce hydrogen form resin or with a base to produce hydroxyl form resin. In either instance, the regeneration process is undesirable since toxic by-products are produced.

At the present time, ion exchange resins are purified or regenerated by separating anionic and cationic resins from their mixtures and contacting them with a large excess concentration of a given ion for a sufficient amount of time. Ions other than the regenerant ion are excluded from the resin approximately in proportion to the ratio of regenerant ion concentration to the concentration of the other ions, with the proportionality constant being dependent upon the specific ions and resins in question. Since regenerants are normally used at concentrations of about $10^5$ ppm and other ions in the regenerant solution are present at concentrations of about $10^1$ to $10^3$ ppm, the proportion of regenerant to impurity remaining in the resins are typically in the ratio of $10^4$ to $10^2$, depending on the selectivity of the resin for regenerant versus impurity. Although it is possible to regenerate resins using regenerants of high purity, this is impractical due to the high cost of producing and maintaining ultrapure regenerants. In cases where the anion and cation resin types have been mixed, the separation step is difficult and is never completely accomplished. This causes an additional contamination as resin regenerated with regenerant meant for resin of a different type acts as an impurity.

When regenerated resins are placed in an environment where the concentration of regenerant ions are much lower than that of the regenerant solution, they are capable of effecting high purification factors. For example, the hydrogen ion and hydroxide ion concentration in water are $10^{-4}$ to $10^{-3}$ ppm which means that, when treating water with the regenerated resin, there is a large driving force to remove other ions from the water. The water ions are not sufficiently concentrated to leach out any substantial amounts of impurities that remain on the ion exchange resin as a result of the prior contact with the regenerant solution originally containing these impurities.

At the present time, the purity requirements for critical solutions such as those used in the electronics industry, are becoming more stringent to the point that even the small amount of impurity ions on the regenerant-treated ion exchange resins become a significant undesirable factor. This is a particular problem when purifying solutions having a high concentration of the regenerant ion. In addition to impurities introduced onto ion exchange resins by regenerant solutions and unseparated resin of opposite charge, the resins contain other microimpurities within their matrices, namely unexcluded co-ions and uncharged materials such as organics that are included within the matrix during resin synthesis or regeneration, or that are formed by resin degradation during storage and use. When the concentration of regenerant ions in the solution to be purified is higher than the concentration of the ions in the solution used during regeneration, it is clear that in most cases, the solution being purified cannot be purified to a level better than the purity of the regenerant.

The use of bifunctional membranes to remove gases or dissolved solids is disclosed in U.S. Pat. Nos. 4,871,431 and 4,969,983.

Accordingly, it would be desirable to provide ion exchange resin particles having a purity which exceeds that of resin particles available from presently used resin regeneration or purification processes.

SUMMARY OF THE INVENTION

The present invention provides a process for purifying resin particles such as ion exchange resin particles by a bifunctional electrodeionization process which utilizes a bipolar interface comprising a bipolar membrane or by contacting, without admixing, cation exchange resin particles with anion exchange resin particles. As a first step in this process, a purified water feed is provided by a purification step capable of producing at least 1 megohm-cm water such as by polishing or by electrodeionization. When utilizing electrodeionization to produce the purified water feed, the water can be continuously recycled between the purification step and the bifunctional electrodeionization step of this invention or from the ion depletion compartment outlet to the ion depletion compartment inlet of the bifunctional electrodeionization step thereby to continuously improve the water purity. The resin purification electrodeionization bifunctional step is conducted under conditions to dissociate pure water at the bifunctional interface to form hydrogen ion and hydroxyl ion. The hydrogen ions and hydroxyl ions then are exchanged with cations and anions respectively in the resin particles located in the ion depletion compartments positioned on either side of a concentration compartment.

The bifunctional electrodeionization apparatus comprises contiguous ion depletion compartments wherein one compartment contains anion exchange resin particles, while the other compartment contains cation exchange resin particles and which are separated by a bipolar interface. The bipolar interface can comprise a bipolar membrane, a monopolar membrane (either anion or cation) in contact with resin beads of opposite charge or can be formed by contacting without mixing, the anion exchange resin particles and the cation exchange resin particles. When utilizing a bipolar membrane, the cation permeable portion of the membrane contacts the cation exchange resin and the anion permeable portion of the membrane contacts the anion exchange resin.

The cation exchange resin is retained in the cation depletion compartment by the bipolar interface on one side and a cation permeable membrane on the other side. The anion exchange resin is retained in the anion depletion compartment by the bipolar interface on one side and an anion permeable membrane on the other side.

An ion concentration compartment is positioned in contact with each anion permeable membrane and cation permeable membrane and water for accepting ions from the ion depletion compartments is passed therethrough.

The resin particles are purified by the production of hydrogen or hydroxyl ions at the bipolar interface which then migrates through the resin particles to displace the ionic impurities therein. By virtue of recycling the increasingly purified water as set forth above, the resin particles become increasingly pure so that virtually all of the ionic impurities therein are removed. The bipolar electrodeionization step or steps are capable of electrochemically producing hydrogen and hydroxyl ions at a concentration of about $10^4$ parts per million (ppm) or more from water which contains only $10^{-2}$ to $10^{-5}$ ppm levels of impurities. The ratio of regenerant hydrogen and hydroxyl ions to impurity is $10^6$ to $10^9$ or more which is approximately two to five orders of magnitude better than the presently available chemicals practically available for resin regeneration. When utilizing resins having a purity described above, liquid purification of $10^{-5}$ ppm or less contaminants can be obtained, depending on the concentration of regenerant ions in the solution to be purified.

DESCRIPTION OF SPECIFIC EMBODIMENTS

Figure 1:
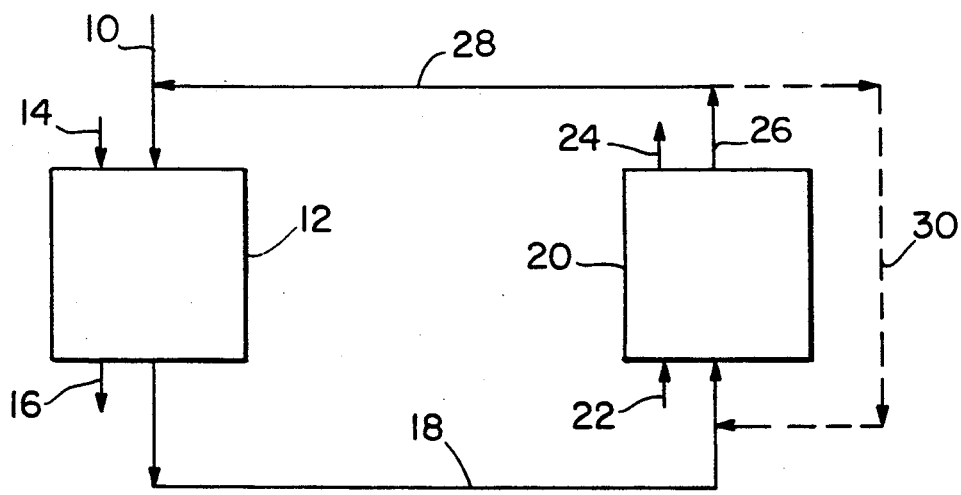
FIG. 1 is a schematic view of a process which can be utilized to produce pure water or to purify resin particles.

In accordance with this invention, ion exchange resin particles are purified in a bipolar electrodeionization step wherein an anion depletion compartment containing anion exchange resin is separated from a cation depletion compartment containing cation exchange resin by means of a bipolar interface. The water introduced into the anion and cation depletion compartments is purified to a level of at least 1 megohm-cm resistivity prior to being introduced into the ion depletion compartments. Water purification can be effected in a separate electrodeionization step which utilizes ion depletion compartments or in a water polishing process described in U.S. Pat. No. 4,430,226 which is incorporated herein by reference or by reverse osmosis. The means for purifying water described in U.S. Pat. No. 4,430,226 comprises a cartridge containing a particulate admixture of activated carbon and mixed ion exchange resins. This cartridge is utilized in the Milli-Q ™ purification apparatus available from Millipore Corporation, Bedford, Mass., which comprises four water treatment cartridges containing sequentially, activated carbon, ion exchange resin, and finally the activated carbon/ion exchange resin mixture which is capable of producing 18 meg-ohm high purity water essentially free of organics.

A configuration of the ion depletion compartments of the initial water purification electrodeionization apparatus which can be utilized in the present invention is disclosed in U.S. Pat. Nos. 4,632,745; 4,747,929; 4,804,451 and 4,956,007 and application Ser. No. 417,950, filed Oct. 6, 1989 which are incorporated herein by reference. The configuration disclosed in these three patents can be utilized in the resin purification step of this invention, except that a bipolar interface is utilized in the manner set forth below. Briefly, the ion depletion compartments have a spacer in which a plurality of subcompartments are formed by a plurality of ribs that extend along the length of the ion depletion compartments. Inlet and outlet means are provided to permit passage of water through the compartment. The thickness of the subcompartments is defined by an anion permeable membrane bonded to one surface of the spacers and the ribs and by a cation permeable membrane bonded to a second surface of the spacers and the ribs. The width of the subcompartment is defined by the distance between adjacent ribs.

The thickness of the subcompartment can be between about 0.25 and about 0.05 inches, preferably between about 0.06 and 0.125 inches. The width of the subcompartment should be between about 0.3 and about 4 inches, preferably between about 0.5 and about 1.5 inches. There is no limit on the length of the compartment other than as dictated by practical construction and fluid pressure loss considerations. The longer the subcompartment length, the greater the ion removal from the liquid and resin beads therein. Generally, the length of the subcompartments are between about 5 inches and about 70 inches. The subcompartments can contain 100% anion exchange material, 100% cation exchange material or a mixture of the two. By utilizing the subcompartment structure in the depleting compartments, efficient mixing of the liquid and the beads therein is attained while avoiding channeling of the liquid through the depleting compartments, as well as avoiding compaction or movement of the beads within a portion of the volume of the depleting compartment. Thus, efficient interchange of the ions in the liquid in the depleting compartment with the ions in the beads to effect ion removal from the liquid and from the beads in the depleting compartment is attained. However, it is to be understood that the purified water utilized in the present invention can be obtained from any source. The electrodeionization process described above comprises a preferred source of the purified water since it can be used both as a source of purified water and as a means for purifying the resin particles.

In the bipolar electrodeionization step where ion exchange resin particles are purified, the anion exchange resin beads are maintained separately from the cation exchange resin beads, unlike conventionally utilized electrodeionization processes where the anion and cation exchange resin beads are usually admixed. The anion exchange resin beads are separated from the cation exchange resin beads by a bipolar interface which can comprise a bipolar membrane, a monopolar membrane and a resin of opposite charge or an interface formed by contacting, without significant admixing, a layer of the anion exchange resin beads and a layer of cation exchange resin beads. When the resin beads are directly contacted, a porous layer, such as an open mesh screen, a porous plastic material, or the like, can be positioned at the bipolar interface to facilitate resin bead contact while minimizing admixture of the anion exchange resin beads and the cation exchange resin beads. The porous layer can optionally be chemically modified with charged functional groups to promote formation of hydrogen ion and hydroxyl ion which migrate into the resin beads to replace the ionic impurities therein.

In accordance with the process of the invention the bipolar electrodeionization process is conducted under conditions to dissociate water at the bipolar interface to produce hydrogen ions and hydroxyl ions. The hydrogen ion is exchanged with cation impurities in the resin particles while the hydroxyl ion is exchanged with anion impurities in the resin particles. The impurities migrate through the ion-permeable membranes into the concentration compartments of the electrodeionization apparatus. Suitable conditions for forming hydrogen and hydroxyl ion include feed water of purity of at least 1 megohm-cm, a minimum voltage differential at the biopolar interface of at least 1 volt, and an operating current efficiency (impurity ions exchanged with $H^+$ or $OH^-$) of about 30% or less.

A bipolar interface is defined as an interface created either by a bipolar membrane, a monopolar membrane in intimate contact with resin of opposite charge, or by two oppositely charged resins in contact with one another without significant admixing. Such an interface is used to split water to hydroxyl ion and hydrogen ions. The bipolar interface divides the cell into two compartments with the cation side facing the cation membrane and the anion side facing the anion membrane. The cation resin to be purified is loaded between the cation face and the interface while the anion resin is loaded between the anion membrane and the interface. When a D.C. current is applied across the cell, the bipolar interface polarizes creating hydrogen ions and hydroxyl ions which transport through the respective resins displacing contaminant ions such as sodium ion and chloride ion. The contaminant ions are collected in ion concentration compartments. During the ultra regeneration, ultrapure water is purged through the resin cells. Since the ions are generated from ultrapure water, there are no contaminant ions added by the streams, resulting in ultra regenerated resins.

All resins having ionic sites can be purified in accordance with this invention to produce the hydrogen form or hydroxyl form of the purified resin. Representative particulate ion exchange resins which can be purified in accordance with this invention include gel and macroporous sulfonated polystyrene-divinylbenzene and aminated polystyrene-divinylbenzene (either Type I or Type II) such as those available under the trademark DOWEX from the Dow Chemical Company; or the like; and chromatography resins. Typical resins include sulfonated phenolic resins, acrylic or methacrylic resins, polystyrene phosphonic acid or iminodiacetic acid resins, aminated acrylic or methacrylic resins, epoxy polyamine resins, or aminoethyl cellulose resins or the like.

The purified anion exchange resin particles produced by the process of this invention contain less than about 1% of anionic impurities other than hydroxyl ion. The purified cation exchange resin particles produced by the process of this invention contain less than about 0.1% cationic impurities other than hydrogen ion.

In another aspect of this invention, incoming water can be purified by being exposed to ultraviolet (UV) light prior to being purified by the initial electrodeionization step. The water is purified to effect ion removal and essentially complete removal of total organic carbon (TOC) by exposure to ultraviolet radiation to effect oxidation of organics followed by the electrodeionization. In the ultraviolet radiation exposure step, water is exposed to radiation having a wavelength that promotes oxidation of organics, e.g., 184.9 nanometers. In the electrodeionization step, the water is passed through one or more depletion compartments to produce high resistivity (megohm-cm) water continuously. The organics treated in the ultraviolet radiation exposure step are passed from the water in the ion depletion compartments through ion permeable membranes into adjacent concentration compartments within the electrodeionization step. Additional process steps can be added such as an ultrafiltration step in order to further improve product purity.

Referring to FIG. 1, either water to be purified or pure water is introduced through conduit 10 into water purification step 12 adapted to produce at least 1 megohm-cm water. When step 12 is an electrodeionization step for purifying water, water from conduit 10 is introduced into ion depletion compartments containing ion exchange resin beads, preferably a mixture of anion exchange resin and cation exchange resin so that anion and cation impurities are removed from the water. Also, when step 12 is an electrodeionization step, water for accepting ions from the water to be purified is introduced through conduit 14 into concentration compartments of step 12 and is removed through conduit 16 to be discarded or introduced through conduit 22 into ion concentration compartments of bipolar electrodeionization step 20. In electrodeionization step 12, conditions are maintained to minimize or prevent hydrogen ion or hydroxyl ion formation so that transfer of ions through the resins and membranes other than hydroxyl ion or hydrogen ion are maximized. These conditions include feed water purity of at least 1 megohm-cm, a voltage across the ion-exchange surfaces of less than about 1 volt and operating current efficiency of greater than about 30%. The purified water is directed through conduit 18 to anion depletion compartments and cation depletion compartments in bipolar electrodeionization step 20. Concentrate water is introduced through conduit 22 into concentration compartments in step 20 and is removed therefrom by conduit 24 to be discarded. In bipolar electrodeionization step 20 ion impurities in the resin beads migrate from the anion and cation depletion compartments through the ion permeable membranes into the water in the ion concentration compartments so that both the resin beads and water become depleted of ions other than hydrogen and hydroxyl ions. In bipolar electrodeionization step 20, conditions are controlled so that water is disassociated to hydrogen ion and hydroxyl ion. Suitable conditions include a feed water of purity of at least 1 megohm-cm, a bipolar interface, voltage differential at the interface of at least 1 volt and operating current efficiency (impurity ions to $H^+$ and $OH^-$) of about 30% or less. The purified water passes through conduit 26 to be recycled either through conduit 28 to the ion depletion compartments of electrodeionization step 12 or through conduit 30 to the anion depletion compartments and cation depletion compartments of bipolar electrodeionization step 20. By continuous recycling of the increasingly pure water as described, the resin beads in the anion depletion compartments and cation depletion compartments in step 20 are rendered substantially completely free of ion impurities. The pure beads then are removed from the anion depletion compartments and cation depletion compartments of step 20 for use as described, while step 12 can remain intact for subsequent use to purify water as described herein.

Figure 2:
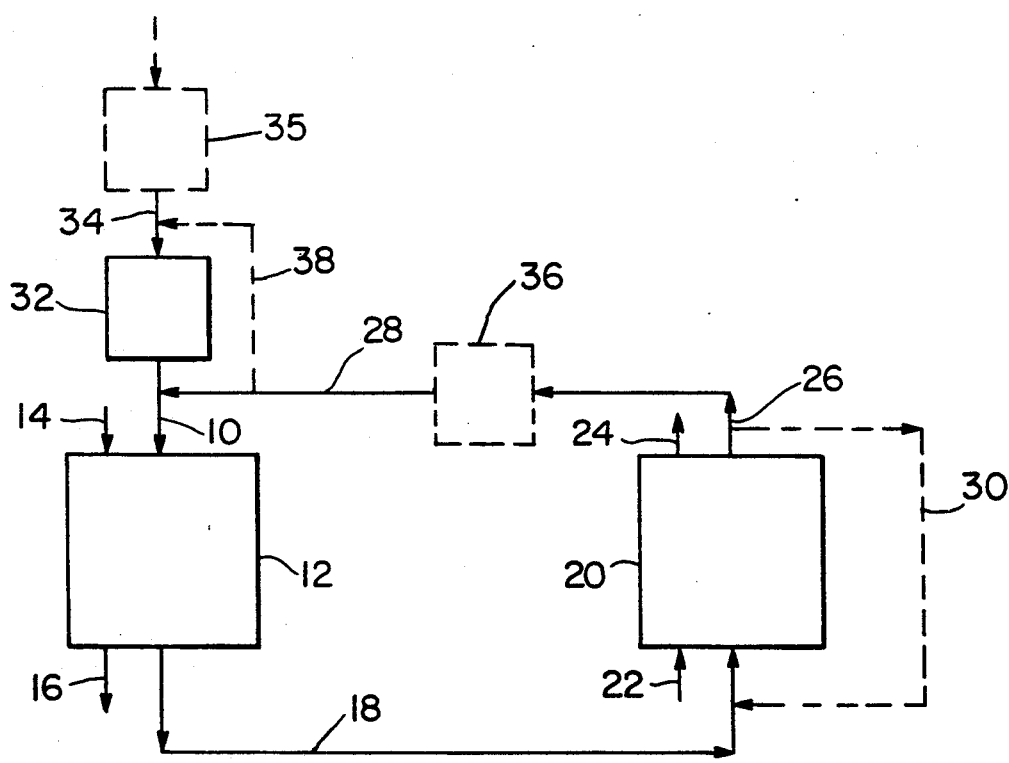
FIG. 2 is a schematic view of an alternative process which can be utilized to produce pure water or to purify resin particles.

Referring to FIG. 2 where like numerals refer to the same elements described above with reference to FIG. 1. Either water to be purified or pure water is introduced through conduit 34 into step 32 for exposure to UV light to assist in TOC removal as described above. If desired, the water to be purified can be treated in a preliminary treatment step 35, such as reverse osmosis. The water is directed through purification step 12, conduit 18, and bipolar electrodeionization step 20 where ionized products produced from TOC in step 32 are removed from the water with ion impurities. The purified water can be subjected to an additional purification step 36 such as ultrafiltration. The purified water can be recycled through conduits 28, 38 and 34 to UV treatment step 32 or through conduits 28 and 10 to purification step 12 or through conduits 26, 30 and 18 to bipolar electrodeionization step 20. The conditions in steps 12 and 20 are the same as those conditions described above with reference to FIG. 1. The water and resin beads in the electrodeionization steps become increasingly purified as described above. The pure resin beads are then recovered from step 20.

Figure 3:
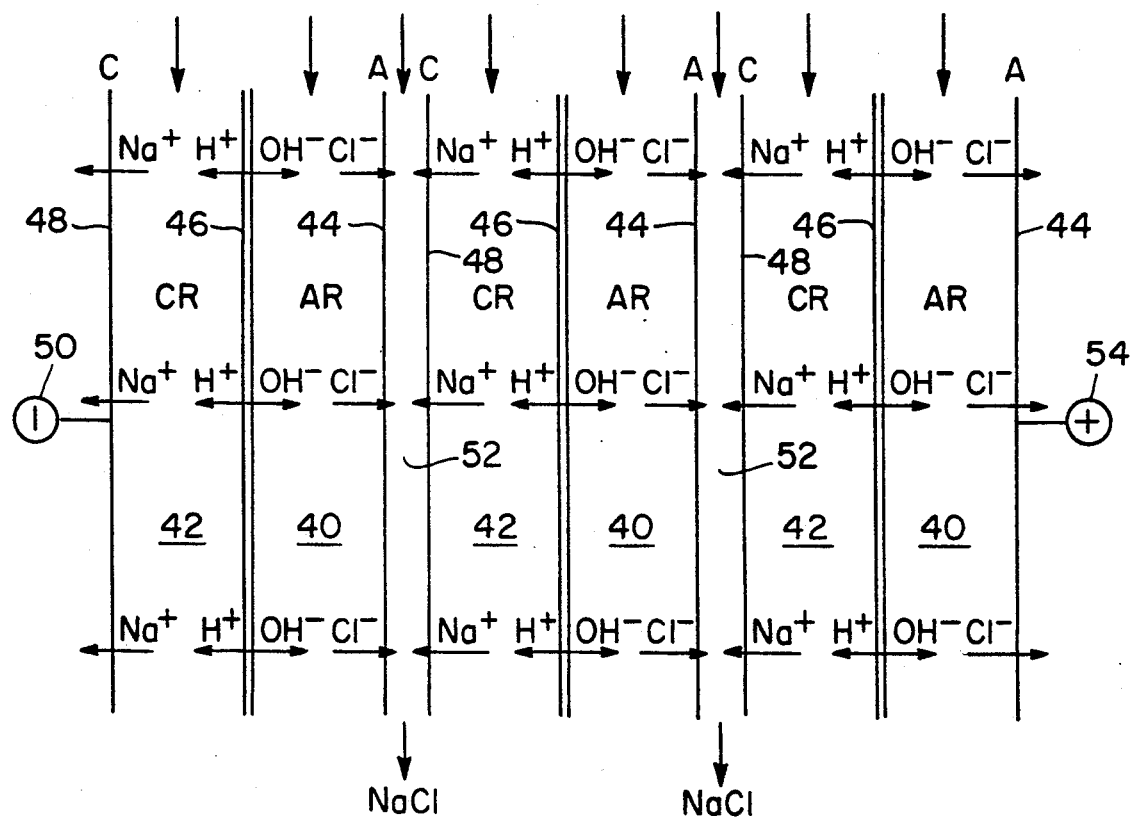
FIG. 3 illustrates a process flow arrangements within a bipolar electrodeionization application of this invention.

Referring to FIG. 3, the bipolar electrodeionization step is comprised of anion depletion compartments 40 and cation depletion compartment 42. The anion depletion compartment 40 contain anion exchange resin particles while the cation depletion compartments 42 contain cation exchange resin particles. The thickness of the anion exchange compartment 40 is defined by an anion permeable membrane 44 and a bipolar interface 46. When the bipolar interface is a bipolar membrane, the anion permeable layer of the membrane contacts the anion exchange resin while the cation permeable layer of the membrane contacts the cation exchange resin. The thickness of the cation depletion compartment 42 is defined by a bipolar interface 46 and a cation permeable membrane 48. Water to be purified is introduced into each of the cation depletion compartments 42 and anion depletion compartments 40.

As illustrated in FIG. 3, cations such as sodium ion, migrate from the cation exchange resin (CR) through the cation permeable membrane 48 toward the cathode 50 and into a concentrate stream in concentration compartments 52. Anions such as chloride ion migrate from the anion exchange resin (AR) through the anion permeable membrane toward the anode 54 and into the concentrate stream in concentration compartments 52. The impure ion are recovered as a salt such as sodium chloride and discarded. Also, as illustrated in FIG. 3, the hydroxyl and hydrogen ions are formed at the bipolar interface 46.

Figure 4:
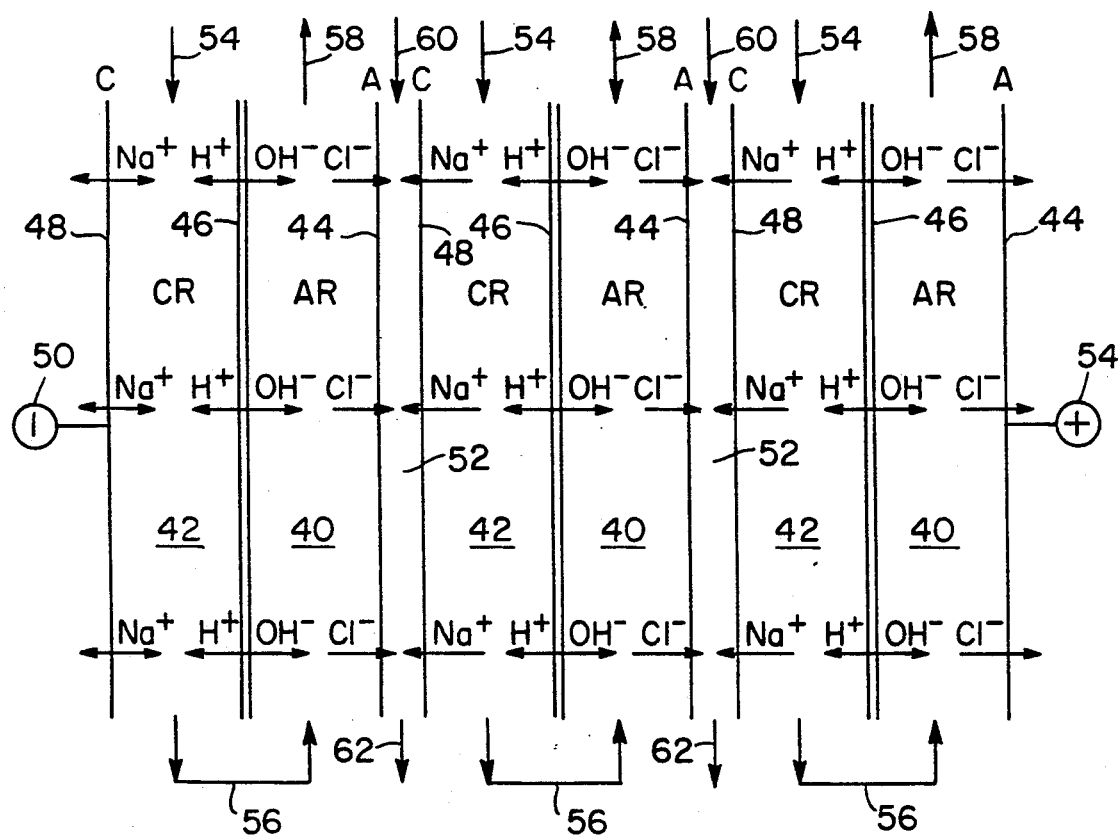
FIG. 4 illustrates an alternative process flow arrangement within a bipolar electrodeionization apparatus of this invention.

Referring to FIG. 4 where like elements as those in FIG. 3 are identified by the same numerals, an alternative process for conducting the bipolar electrodeionization step is shown. As shown in FIG. 4, the water being purified is passed through at least one set of a cation depletion compartment 42 and an anion depletion compartment 40. Pure water is introduced through conduits 54 into cation depletion compartment 42, through conduits 56, through anion depletion compartments 40 and recovered from conduits 58. Concentrate water is introduced into ion concentration compartments 52 by conduits 60 and recovered from conduits 62. It is to be understood that the pure water can be introduced into the anion depletion compartments first. Also, it is to be understood that the pure water from conduit 58 can be introduced into the next adjacent cation depletion compartment 42 so that the pure water is passed through a plurality of sets of anion depletion compartments 40 and cation depletion compartments 42 positioned between a cathode 50 and an anode 54. In any event, both the anion exchange resin beads and cation exchange resin beads become purified as set forth above. The anion depletion compartments 40 and cation depletion compartments 42 are formed with spacers and ribs in the manner set forth above.

The initial electrodeionization step can be controlled by measuring product water conductivity from all or any one of the stages and adjusting the process parameters including process voltage, liquid flow velocities, temperatures, pressures, and electrical current accordingly.

The following example illustrates the present invention and is not intended to limit the same.

EXAMPLE I

The following is a description of two methods for controlling the demineralization of the initial electrodeionization system. The methods can be used separately or in combination in a single or multi-electrical staged system. The first method senses the resistivity and temperature of the feed water and the appropriate cell pair voltage is applied to demineralize the liquid to the desired fraction salt removal.

The second method senses the product resistivity and temperature that is used to control the voltage of the stage to produce water of the desired quality. This type of voltage control can be used to provide product water of a pre-selected quality.

An example of a two-stage system is as follows: The first stage is operated at a variable voltage based on the feed water quality (about 0.5 and 5 volts per cell pair) appropriate to achieve approximately 70–95 percent salt removal by using a predetermined resistivity/temperature/ percent salt removal relationship. The automatically applied voltage permits operation below the polarization point, thus assuring efficient operation without scaling. The second stage is operated at a variable voltage based on the product water quality (about 0.5 to 5 volts per cell pair), appropriate to provide water of a pre-selected quality. Since the feed water to the second stage is product water from the first, the second stage feed is less prone to scaling. For this reason polarization in the second stage is acceptable, and the voltage can therefore be varied to any degree to provide the required product quality.

In a second specific embodiment of an initial water purification electrodeionization step, an electrodeionization stage includes an anode compartment, a cathode compartment and, a series of ion concentration compartments which alternate with a series of ion depletion compartments. Each of the concentration compartments and depletion compartments contains a solid ion exchange material such as a mixture of anionic exchange resin and cationic exchange resin.

As regards the second specific embodiment, the term "dual compartment" means a compartment formed of an odd number of permeable membranes, at least one depletion compartment and at least one concentration compartment, each of which compartments are divided into subcompartments, as described above. The ion permeable membranes are arranged so that the anion permeable membrane and the cation permeable membrane alternate along the thickness of the dual compartment. Thus, the dual compartment can include one more cation permeable membrane than anion permeable membrane or can include one more anion permeable membrane than cation permeable membrane of the odd number ion permeable membranes.

What is claimed is:

1. A process for purifying anion exchange resin particles and cation exchange resin particles containing less than about 1% and 0.1% ionic impurities respectively other than hydroxyl ion or hydrogen ion which comprises:

providing a water stream having a purity of at least about 1 megohm-cm, passing said water stream through ion depletion compartments containing said resin particles in an electrodeionization apparatus, said electrodeionization apparatus comprising:

a cathode compartment at a first end of said apparatus, an anode compartment at an end of said apparatus opposite said first end, a plurality of sets of an anion depletion compartments and cation depletion compartments alternating with ion concentration compartments positioned between said cathode compartment and said anode compartment, each anion depletion compartment and each cation depletion compartment being separated by a bifunctional interface, passing a second liquid for accepting ions from said water stream through said concentration compartments while said water stream is passed through said anion depletion compartments and said cation depletion compartments, applying an electrical voltage between an anode in said anode compartment and a cathode in said cathode compartment, and recovering said purified resin particles.

2. A process for purifying anion exchange resin particles and cation exchange resin particles containing less than about 1% and 0.1% ionic impurities respectively other than hydroxyl ion or hydrogen ion which comprises:

providing a water stream having a purity of at least about 1 megohm-cm, passing said water stream through ion depletion compartments containing said resin particles in an electrodeionization apparatus, said electrodeionization apparatus comprising:

a cathode compartment at a first end of said apparatus, an anode compartment at an end of said apparatus opposite said first end, a plurality of sets of an anion depletion compartments and cation depletion compartments alternating with ion concentration compartments positioned between said cathode compartment and said anode compartment, each anion depletion compartment and each cation depletion compartment being separated by a bifunctional interface, passing a second liquid for accepting ions from said water stream through said concentration compartments while said water stream is passed through said anion depletion compartments and said cation depletion compartments, applying an electrical voltage between an anode in said anode compartment and a cathode in said cathode compartment, recovering purified water from said depletion compartments, and recycling purified water to said anion depletion compartments and said cation depletion compartments for a sufficient time period to form purified ion exchange resin particles in said anion depletion compartments and said cation depletion compartments, and recovering said purified resin particles.

3. The process of any one of claims 1 or 2 wherein said water stream is produced by an electrodeionization purification step.

4. The process of claim 3 wherein said water stream having a purity of at least 1 megohm - cm is produced in said ion depletion compartments and said purified water is recycled to ion depletion compartments in said electrodeionization purification step.

5. The process of claim 4 wherein operating conditions in said electrodeionization step minimize the formation of hydroxyl ion and hydrogen ion.

6. The process of claims 3 wherein said bifunctional interface is a bipolar membrane.

7. The process of any one of claims 1 or 2 wherein said water stream is exposed to ultra-violet radiation and is then introduced into an electrode-ionization purification step.

8. The process of claim 7 wherein purified water is produced in said ion depletion compartments and said purified water is recycled to ion depletion compartments in said electrodeionization purification step.

9. The process of claim 8 wherein operating conditions in said electrodeionization step minimize the formation of hydroxyl ion and hydrogen ion.

10. The process of claims 7 wherein said bifunctional interface is a bipolar membrane.

11. The process of any one of claims 1, 2, 4, 8 or 5 wherein said bifunctional interface is a bipolar membrane.

* * * * *